United States Patent [19]

Gardner

[11] 4,151,723
[45] May 1, 1979

[54] REFRIGERATION SYSTEM CONTROL METHOD AND APPARATUS

[75] Inventor: Edward B. Gardner, Bloomfield, Conn.

[73] Assignee: Emhart Industries, Inc., Hartford, Conn.

[21] Appl. No.: 816,091

[22] Filed: Jul. 15, 1977

[51] Int. Cl.² ............................................. F25D 21/02
[52] U.S. Cl. ........................................ 62/155; 62/156; 62/234
[58] Field of Search ................. 62/234, 155, 158, 156; 165/12; 236/15 BG, 46 R; 340/518, 519, 585; 137/624.13

[56] References Cited

U.S. PATENT DOCUMENTS

| 3,453,837 | 7/1969 | Sandstrom et al. | 62/156 |
| 3,483,555 | 12/1969 | Birard et al. | 340/518 |
| 3,894,404 | 7/1975 | Stanton | 62/155 |

OTHER PUBLICATIONS

Serial #812,198, Willitts et al., Filed 7/1/77, Commanly Assigned.

Primary Examiner—William E. Wayner
Attorney, Agent, or Firm—McCormick, Paulding & Huber

[57] ABSTRACT

A refrigeration system contains a common compressor supplying refrigerant to a plurality of evaporators that are refrigerated and defrosted independently of one another. Individual refrigeration/defrost controls are provided in solid state form for the respective evaporators, and the individual controls are connected with a master control that prevents all of the evaporators from being defrosted at one time. The master control includes a digital time clock providing time signals to each of the individual refrigeration/defrost controls, and each of the individual controls can initiate a defrost operation for its respective evaporator on either a timed or demand basis. The master control includes a scanner that interrogates the individual controls in a special manner to initiate defrosting of the units in order of priority. The master control permits an individual defrost control for a selected evaporator to be tested in a timed mode by substantially increasing the speed of the time clock while operation of the remaining defrost controls is inhibited.

32 Claims, 9 Drawing Figures

REFRIGERATION SYSTEM CONTROL METHOD AND APPARATUS

BACKGROUND OF THE INVENTION

The present invention relates to the method and apparatus for controlling defrost and refrigeration operations in a refrigeration system having a plurality of evaporators. More particularly, the invention relates to controls allowing the evaporators to be defrosted and refrigerated independently and without overloading the system. The invention has utility in refrigeration systems having hot gas or other defrosting equipment.

It is customary in large refrigeration systems such as found in food stores or supply houses to utilize an integrated refrigeration system for a plurality of refrigeration units. A common compressor and condenser supply all of the refrigerant needed by the evaporators in the various units. However a certain degree of independency of the units is required because of the different demands imposed on the units. For example, in a food store, a refrigeration cabinet containing ice cream or frozen foods is normally held at approximately $-20°$ F. and imposes far more stringent demands on the refrigeration system than a milk cabinet or vegetable tray that operates in the vicinity of $+40°$ F. Furthermore, temperature and humidity conditions and the frequency with which the cabinets are opened and closed at various times of the day also affect the refrigeration process. Because of the variations in demand, the accumulation of ice and frost on different evaporator coils in the system varies widely, and independent defrosting and refrigeration controls are needed to keep the evaporators and the system operating efficiently. In this respect, reference to an evaporator is intended to refer to one or more evaporator coils connected in parallel or series to be refrigerated and defrosted in common.

In large commercial refrigeration systems, defrosting is frequently accomplished by transmitting hot refrigerant in gaseous form directly through the evaporators to melt the accumulated ice and frost. Such hot gas defrosting systems may reduce the available refrigerant for cooling purposes to an inadequate level for other evaporators in the system unless control is exercised over the number of evaporators that can be placed in the defrosting mode at any one time. Also with other defrosting devices such as electrical heaters connected to the evaporator coils, the number of evaporators defrosted at any given time must be controlled to prevent power overloads and undue demands on the refrigeration equipment.

Accordingly, it is customary in refrigeration systems having multiple evaporators to limit the number of evaporators that are placed in the defrosting mode at any given time. Sucn limitations can be imposed by scheduling the defrost operations for particular times of day; however, timed defrosting may not be satisfactory where demands on the refrigeration system are irregular and incapable of prediction. In these cases, a demand defrost system is generally preferred. In a demand system, frost sensors associated with the evaporators provide signals when accumulated frost and ice has reached a given level. In the absence of further control, however, it is clear that a demand system could place more than one and possibly all of the evaporators in defrost at one time. To prevent this possibility, control systems have been devised such as disclosed in U.S. Pat. No. 3,894,404 and copending U.S. patent application Ser. No. 812,198 filed July 1, 1977 by Willitts and Zickwolf and entitled "Automatic Defrost Control for Refrigeration Systems". In the copending application, scanning means are provided to periodically interrogate or examine the frost sensors in a predefined sequence. When one of the sensors indicates that its corresponding evaporator is in need of defrost, scanning is halted until defrost of the evaporator is complete. A certain priority can be developed by increasing the frequency that one evaporator is scanned relative to the others. Thus, for example, a high priority evaporator can be scanned twice as often as the other evaporators to increase the probability of detecting the need for defrost at an earlier point in time.

It is an object of the present invention to provide a defrost and regrigeration system which allows a plurality of evaporators to be controlled independently of one another and which constitutes and improvement over the prior art systems.

SUMMARY OF THE INVENTION

This invention resides in a refrigeration and defrost system that allows defrost of individual evaporators to be controlled independently and on either a timed or a demand basis. The system includes scanning means that allows the evaporators to be defrosted on a priority basis so that more important evaporators are considered first. The system also includes provisions for testing the defrosting equipment associated with individual evaporators and in one embodiment incorporates solid state design. A unique decoding system is employed to derive time signals from a time clock having a digital display, and testing of individual defrost controls in a timed mode is accomplished by driving the time clock at an accelerated rate.

BRIEF DESCRIPTION OF THE DRAWINGS

FIG. 7 is an electrical schematic illustrating the power supply for the digital time clock and the defrost controls.

DESCRIPTION OF THE PREFERRED EMBODIMENTS

Figure 1:
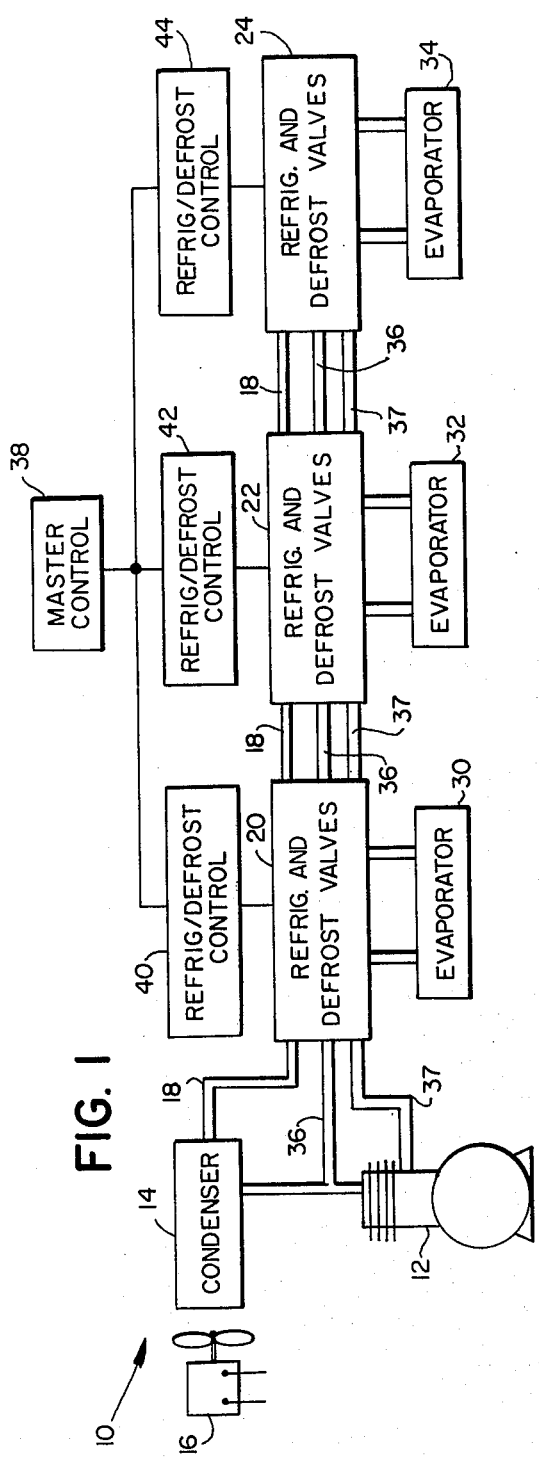
FIG. 1 is a schematic diagram illustrating the overall refrigeration system having a plurality of evaporators with individual refrigeration/defrost controls for each evaporator.

FIG. 1 illustrates the components of a refrigeration system, generally designated 10, embodying the present invention. A compressor 12 delivers hot, gaseous refrigerant to a condenser 14 where heat is transferred to the ambient air with the aid of a cooling fan 16. Cooled and condensed refrigerant is directed in a conduit 18 from the condenser to evaporators 30, 32, 34 by refrigeration and defrost control valves 20, 22, 24 respectively when the valves are individually set in the refrigeration mode. When the valves are set in a defrost mode, the compressor 12 supplies hot refrigerant in gaseous form to the respective valves and associated evaporators through the conduit 36. The conduit 37 returns the refrigerant to the compressor. A more detailed description and explanation of the refrigeration and defrost valves may be had from the above-referenced copending application Ser. No. 812,198 of Willitts and Zickwolf.

The refrigeration and defrost operations or cycles for the plurality of evaporators 30, 32, 34 are controlled by a master control 38 associated with all of the valves and evaporators, and individual refrigeration/defrost controls 40, 42, 44 connected separately and independently with the respective valves and evaporators. Thus, the individual control 40 regulates the flow of condensed or hot refrigerant through the valves 20 and evaporator 30, the individual control 42 regulates the flow of condensed or hot refrigerant through the valves 22 and evaporator 32, and the individual control 44 regulates the flow of refrigerant through the valves 24 and evaporator 34.

From the above description, it will be understood that the refrigeration system 10 has a hot gas defrosting system to defrost the evaporators 30, 32, 34 individually. However, the present invention is not limited to a hot gas defrost system and other types of defrosting equipment such as electrical heaters can be connected respectively with the evaporators to permit independent defrosting of the separate evaporators.

Figure 2:
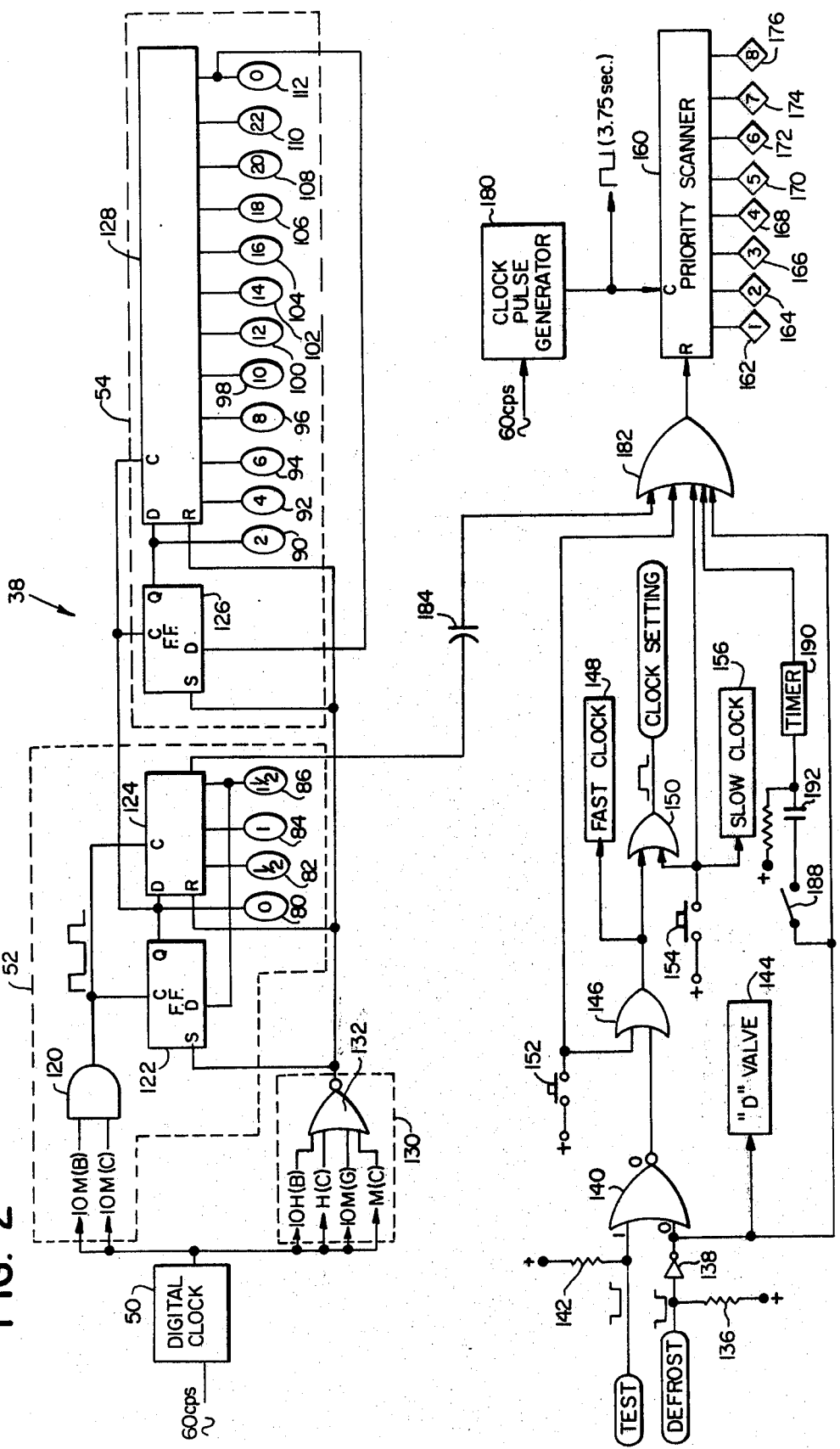
FIG. 2 is an electrical diagram illustrating the various components in the master control for the refrigeration system.

The master control 38 in FIG. 1 is illustrated in a solid state embodiment in FIG. 2. Among other functions, the master control provides time signals that allow the individual refrigeration/defrost controls to operate on a timed basis. The control 38 also provides the means by which testing of the individual controls can be accomplished, and includes a unique scanning device that allows the evaporators to be interrogated concerning the need for defrosting in order of priority.

TIME DECODING

In FIG. 2, the basic source of time signals in the master control 38 is the digital time clock 50. While the digital clock is not essential to many aspects of the present invention, it does provide a unique means by which time signals can be generated. In one form, the digital clock is a 24-hour clock having a digital display and by means of a two-hour decoder 52 and a 24-hour decoder 54, a time signal is produced every half hour. Thus, any one of the evaporators in the refrigeration system can be scheduled in the timed mode to defrost at any hour or half hour of the day. Although an evaporator may be scheduled to defrost at a particular time of day, such defrosting will not necessarily occur due to the defrosting of higher priority evaporators as described in greater detail below.

Figure 3:
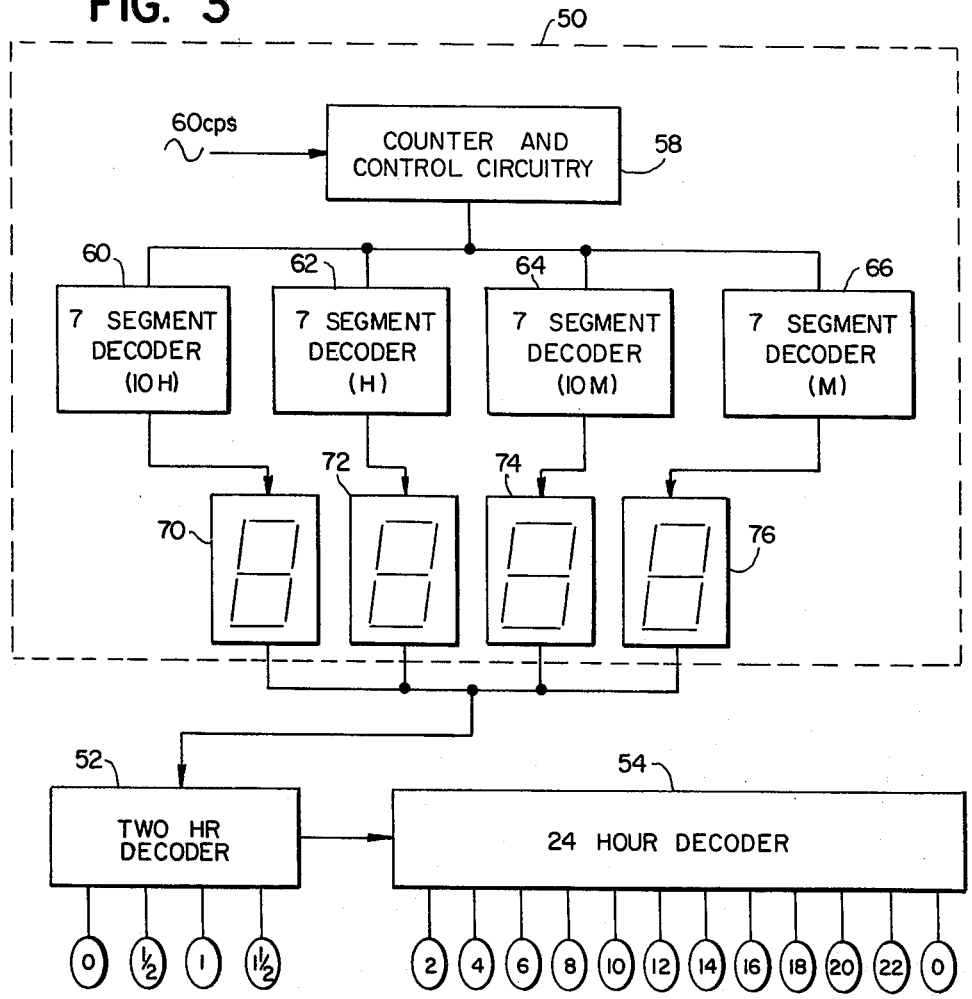
FIG. 3 is a diagram of a digital time clock and decoders which generate time signals for the refrigeration system in one embodiment.
Figure 4:
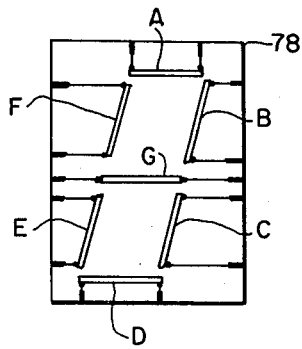
FIG. 4 illustrates in greater detail one of the numeral elements utilized in the digital display of the time clock in FIG. 3.

In order to more fully understand the operation of the time clock 50 and decoders 52 and 54, reference is made to FIGS. 3 and 4. The digital clock 50 has counter and control circuitry 58 which is energized by 60 cycle a.c. power. The circuitry utilizing the 60 cycle power as a timing reference computes time which is preferably output in BCD form to four 7-segment decoders 60, 62, 64, and 66. The 7-segment decoders are associated respectively with numeral elements 70, 72, 74, and 76 that form the digits of the time clock display and each decoder generates one of the time digits. For example, the decoder 60 generates the tens-hour digit, the decoder 62 generates the ones-hour digit, the decoder 64 generates the tens-minute digit and the decoder 66 generates the ones-minute digit. For the purpose of discussion, it will be assumed that the digital clock is a 24-hour clock such as model MA1002 digital clock module manufactured by National Semiconductor Corporation, Santa Clara, California. Each numeral element 70, 72, 74, and 76 has the same construction shown in FIG. 4 and comprises a circuit board 78 having seven light emitting diodes (LED)s or segments A, B, C, D, E, F, and G arranged in a figure-8 pattern. Any decimal integer from 0 to 9 can be illustrated in the pattern in illuminating selected segments in combination, and it will be assumed that the segments are constantly energized when illuminated to form a particular integer. By energizing selected segments in various combinations and patterns in each of the numeral elements, a visual presentation of the time is manifested. The display changes every minute in accordance with the data produced by the counter circuitry 58.

Since the excitation of the segments and the corresponding illumination is peculiar to a given time, a time signal can be generated by determining which segments are illuminated at that particular time, then monitoring the energization or illumination of the segments and producing the time signal when the particular combination or code of illuminated segments is detected. It is not essential that all illuminated segments be used to establish an unambiguous code. Only some of the illuminated segments may be uniquely associated with a particular time. When signals are desired at spaced times throughout a day, particularly evenly spaced times when a digital integer is repeated, it is frequently possible to generate a time signal from less than all illuminated segments. Furthermore, the non-illuminated segments or combinations of illuminated and non-illuminated segments may provide a unique time code. It is also possible that the code be based upon derivative parameters of the digital display such as positive-going or negative-going transitions of the segments between the energized and non-energized conditions. Accordingly, a unique time signal generating means is provided by decoders such as the decoder 52 which monitor the energization of a digital display and produce signals when a predetermined code is detected. By counting or accumulating the time signals, further time interval signals can be obtained.

It can be shown by analysis of the illumination patterns that the B and C segments or LEDs of the tens-minute digit when applied to a coincidence gate, such as the AND gate 120 in the decoder 52 of FIG. 2, initiate a positive pulse on the hour and half hour corresponding to a frequency of two cycles per hour. For digital circuitry, such a cyclic rate is very low, but the resolution provided by time signals generated at that frequency is adequate for selecting defrosting times. The pulse signals are used as clock inputs for a solid state "D"-type flip-flop 122 and a static shift register 124 which serves as a sequencing and accumulating means. Both the flip-flop and shift register respond to the leading edge of the positive pulses, and cause the outputs 80, 82, 84, 86 to sequentially assume a binary 1-state or "high" with each succeeding pulse. Thus, every half hour the outputs change to generate a time signal and only one output is in the 1-state or turned on at any given time. One half-hour after the output 86 is turned on, the leading edge of a subsequent pulse from the AND gate 120 causes the sequencing of the output signals to be started again through the feedback connection with the "D" input of the flip-flop 122. Thus, the four outputs 80-86 of the two-hour decoder are turned on individually and at evenly spaced intervals over a two-hour period. The flip-flop and shift register effectively count the timing pulses produced by the coincidence gate 120 so that the outputs of the decoder provide not only time signals but signals representing accumulated time in half hour increments over a two-hour period as illustrated.

At the end of a two-hour period, when the output 80 is again turned on, the leading edge of a pulse from the output is transmitted to another "D"-type flip-flop 126 and a shift register 128 which comprise the 24-hour decoder 54. The shift register 128 is illustrated as a single shift register, but in fact, could be comprised of a plurality of shift registers connected in series. The operation of the flip-flop 126 and shift register 128 is basically the same as the flip-flop 122 and shift register 124 except that since the clock signals are derived from the decoder 52, the outputs 90-112 are turned on individually in sequence at 2-hour intervals. With twelve such outputs, a time signal is produced from the decoder 54 every 2 hours over a 24-hour period. By applying the time signals from the outputs of both decoders 52 and 54 in various combinations to coincidence gates, a time signal can be produced at any half hour of the day over a 24-hour period.

For purposes of setting the shift registers 124 and 128 a reset circuit 130 is provided. The reset circuit is basically another decoder connected with the digital clock 50 and is comprised of a NOR gate 132. As indicated, the inputs to the gate 132 are taken from the B segment of the ten hour digit, the C segment of the hour digit, the G segment of the 10-minute digit and the C segment of the minute digit. Due to the logic of the NOR gate, a positive pulse is initiated and applied to the flip-flops 122 and 126 and the shift registers 124 and 128 only when none of the identified segments serving as inputs is energized. Thus, the NOR gate functions in response to the non-energization of selected inputs, and it can be shown that with the identified inputs and associated code, the NOR gate produces a positive one minute pulse at 2:02 with a 24-hour clock. A second but inconsequential pulse occurs at 2:12. In response to the leading edge of the first pulse, the outputs of decoders 52 and 54 are set independently of clocking pulses and the outputs assume the states corresponding to the time 2:02. Such setting function is used to synchronize the outputs and the time display of the clock after the system is turned on.

From the above, it will be understood that the time or timing signals for initiating defrost operations are derived from the digital clock 50 by the decoders 52 and 54. Although the signals are generated in half hour increments by the exemplified code, other codes utilizing both energized and non-energized segments permit many other time increments and timing signals to be obtained.

While the digital time clock 50 and decoders 52 and 54 represent a unique means for obtaining time signals, the refrigeration system could also operate with more conventional timing devices providing signals at selected times of day. Also, the illumination of numeral segments from which the decoders operate can be derived from timing devices other than the digital clock. Still further, it is contemplated that energization of numeral elements other than the seven segment numerals may be monitored to produce time signals.

TEST FUNCTION

The master control 38 includes components for testing an individual refrigeration/defrost control for an evaporator. A test function is carried out by programming an individual control 40, 42 or 44 in a time defrost mode of operation and then driving the digital clock at an increased rate until the time is reached when the individual control under test is programmed to initiate a defrost cycle. The control is then examined to determine if a defrost operation has been properly initiated.

In particular, a NOR gate 140 has one input terminal that is normally held in the 1-state by the power supply and a resistor 142 and another input held in the 0-state by the power supply, resistor 136 and digital inverter 138. When a test signal as illustrated in the form of a negative or "low" level signal is received from any of the individual defrost controls 40, 42 or 44, the signal switches the output of the NOR gate to its 1-state, provided that a defrost signal is not present at the other input terminal of the gate. A defrost signal, also illustrated as negative signal, indicates that one of the individual controls and a corresponding evaporator is in a defrosting cycle, and inhibits the NOR gate 140 and test function under such circumstances to prevent more than one evaporator from being placed in a defrosting mode at a time. It should be noted parenthetically that the oval designations in the drawings represent conductors that are common to all of the evaporators, and therefore, the test signal or defrost signal may come from any one of the individual defrost controls 40, 42, 44. A defrost signal is also applied to a "D" valve 144 which reduces the compressor discharge pressure so that hot gas from the compressor can be circulated through the evaporators in a hot gas defrosting system.

Assuming that a defrost operation is not being carried out when the test signal is received, the output of the NOR gate 140 is transmitted through an OR gate 146 of fast clocking circuitry 148 in the digital clock 50, and the digital clock is then driven at an accelerated rate. For example, the digital time display is sequenced through one hour in an actual time of one second. Since the decoders 52 and 54 respond to the display rather than actual time, the time signals produced by the outputs of the shift registers 124 and 128 appear at a correspondingly accelerated rate and the programmed time of defrost for a particular evaporator is reached in short order. As soon as the individual control under test receives its programmed time signal, the control should go into the defrost mode of operation and a defrost signal should be transmitted from the unit under test to the NOR gate 140. The NOR gate 140 is then disabled together with the fast clocking circuitry 148 and the digital clock returns to normal time sequencing. By observing the digital display of the clock, the operator conducting the test can determine if the tested control is functioning properly.

As explained in greater detail below with respect to the individual defrost controls, the test operation will continue until it is terminated by the operator. Termination of the test also terminates defrosting of the tested evaporator so that the defrost signal disappears and the NOR gate 140 reverts to its initial condition.

Since the test function drives the digital clock to the time when the tested evaporator control is programmed for defrost, the termination of the test function will normally leave the digital clock at the wrong time. For this reason, the operator who ran the test should reset the clock to the correct time, and for this purpose, a fast clock setting button 152 and a slow clock setting button 154 are provided. The fast button 152 actuates the fast clocking circuitry 148 through the OR gate to bring the digital clock approximately to the correct time. The operator then presses the slow button 154 which actuates the slow clocking circuitry 156 to drive the clock at a rate much less than the fast clocking circuitry but slightly greater than real time. The slow button is released when the correct time is observed on the digital display.

It will be noted that whenever the time clock 50 is being set during testing or by either the fast or slow buttons 152 and 154, OR gate 150 produces a clock setting signal. The setting signal is used as described hereinafter to disable or lockout all individual defrost controls other than the one under test. The lockout function is necessary because the decoders 52 and 54 continue to respond to the digital display as the clock is set, and the generated time signals may correspond to the programmed times for which certain evaporators other than the one under test are scheduled to defrost.

Accordingly, testing of the individual defrost controls 40, 42, 44 is performed by driving the time clock at a high rate until the programmed time appears in the digital display. Clocking stops at that point and a defrost operation is actually carried out until the operator decides to terminate the test. Thereafter, he resets the clock and the timing signals are generated in correspondence with the actual time of day.

SCANNING FUNCTION

As described above, it is desirable in a refrigeration system having a plurality of evaporators to limit the number of evaporators which can be placed in the defrost mode at any one time in order to minimize power and cooling capacity overloads. It is especially desirable in hot gas defrosting systems to limit the number of evaporators in defrost in order to appropriately scale the capacity of the refrigeration compressor 12. In the present embodiment, only one evaporator is defrosted at a time but higher limits are certainly feasible. Accordingly, the master control of the present invention is provided with a priority scanner 160 which produces sequential probing signals on the outputs 162-176. The probing signals are used to interrogate the evaporators or the individual controls for the evaporators in regard to the need for defrost. In performing the interrogation function in one embodiment of the present invention, the probing signals effectively serve as gating signals and allow an individual control to initiate defrosting of the associated evaporator when the need is indicated. In this respect, the need is shown to exist by a signal from a frost sensor connected with an evaporator or by a programmed time signal generated by the decoders 52 and 54.

The priority scanner 160 is driven by clocking pulses from a clock pulse generator 180. The pulse generator receives standard 60 cycle a.c. current and produces a clocking pulse every 3.75 seconds or 1/16th of a minute. The priority scanner 160 receives the pulses on a clocking input which triggers the outputs 162-176 one at a time and in numbered sequence. One output is turned off and the next output is turned on with each positive transition of the clocking pulses, and when each of the eight outputs has been triggered, the sequence is repeated in a cyclic fashion. Thus, with eight outputs and clocking pulses every 3.75 seconds apart, eight different evaporators associated respectively with the eight outputs can be scanned by the probing signals in a period of 30 seconds.

The priority scanner 160 in one form can be an integrated circuit such as an RCA counter/divider 4022. The circuit resets and holds the scanner on the highest priority output when a 1-state signal is applied to the reset terminal.

Scanning a plurality of evaporators to identify those in need of defrost is disclosed in U.S. Pat. No. 3,894,404 and the copending application Ser. No. 812,198 referenced above. However, the scanner 160 performs the scanning function on a priority basis by always resuming the scanning function when interrupted with the first priority output 162. Thus, by connecting the most important evaporator with the first priority output and other evaporators with the other outputs in order of priority, the more important evaporators and refrigeration cabinets are defrosted before the others.

Such prioritizing of the defrost operations should be distinguished from the prior art systems shown and described in the referenced copending application wherein certain evaporators are interrogated more frequently then other evaporators. In the present system, a definite priority is assigned to each evaporator to ensure that the highest priority evaporators will be defrosted first. Furthermore, the order of priorities is observed regardless of the stage of the scanning sequence when scanning is interrupted.

In the present system, the scanning is interrupted at several junctures. Since no more than one evaporator is placed in a defrost cycle at a time, the defrost signal applied to the NOR gate 140 is also transmitted through an OR gate 182 connected with the reset input of the scanner 160. Regardless of which evaporator is producing the defrost signal, scanning is stopped and ceases as long as the defrost signal holds the output of the OR gate in the 1-state. When the defrost cycle terminates and the defrost signal is removed from the OR gate 182, the scanning function resumes with the first priority output 162 either immediately or, if a switch 188 is closed, after a short delay established by a delay timer 190. With the switch 188 closed, the timer responds through a capacitor 192 to termination of the defrost signal and transmits a delay signal through OR gate 182 which delays the resumption of scanning and allows the system to recover from the previous defrost cycle and balance out in preparation for the next cycle. Thus, if defrost of the evaporator connected with the fourth priority output 168 has just been completed and the evaporators connected with the second priority output 164 and the sixth priority output 174 are both in need of defrost, the scanning operation first picks up the second priority evaporator rather than the sixth priority evaporator. Therefore, the higher priority evaporators are clearly given preference.

The priority scanner 160 is also reset in several other instances. When either the fast clocking button 152 or the slow clocking button 154 is pressed, a triggering signal is applied to one of the inputs of the OR gate 182 to reset and hold the scanner until the time clock 50 is set. Thus, with a new time in the display, scanning restarts with the highest priority evaporator. It will also be understood that whenever one of the individual defrost controls is tested, the time clock is set and a defrost signal resets and holds the scanner until the test is terminated. Scanning again resumes with the highest priority evaporator. Additionally, a fourth input to the OR gate 182 from the two-hour decoder 52 is momentarily pulsed by the two-hour decoder 52 through the capacitor 184 and resets the scanner at the end of each two hour interval when the time signals from the 24-hour decoder change. Resetting at this juncture synchronizes the start of scanning with the start of a new timing period. In this fashion, it is possible to schedule some or all of the evaporators for defrost at a given time of day, for example, 3:00 a.m. When the 3 a.m. signal is generated, the scanner 160 is automatically reset and the scheduled evaporators are defrosted one at a time in order of priority.

Accordingly, the priority scanner 160 interrogates the plurality of the evaporators concerning the need for defrost and gives preferance to those evaporators connected with a higher priority output of the scanner. The scanning function with priority may be utilized when the evaporators are programmed to defrost in either a time mode as described above or in a demand mode where, for example, a plurality of frost sensors simultaneously indicate a need for defrost.

INDIVIDUAL DEFROST CONTROL

Having described the master control 38 in detail, reference is now directed to the individual refrigeration/defrost controls 40, 42, 44. An individual control is provided for each evaporator that is to be refrigerated and defrosted independently of the others. Although three such evaporators and corresponding controls have been shown in FIG. 1, any number of evaporators can be integrated in a refrigeration system providing that the compressor and other components have an appropriately scaled capacity. Since each individual control has the same construction and functions in the same manner, only one such control is described and shown in FIGS. 5 and 6.

Figure 5:
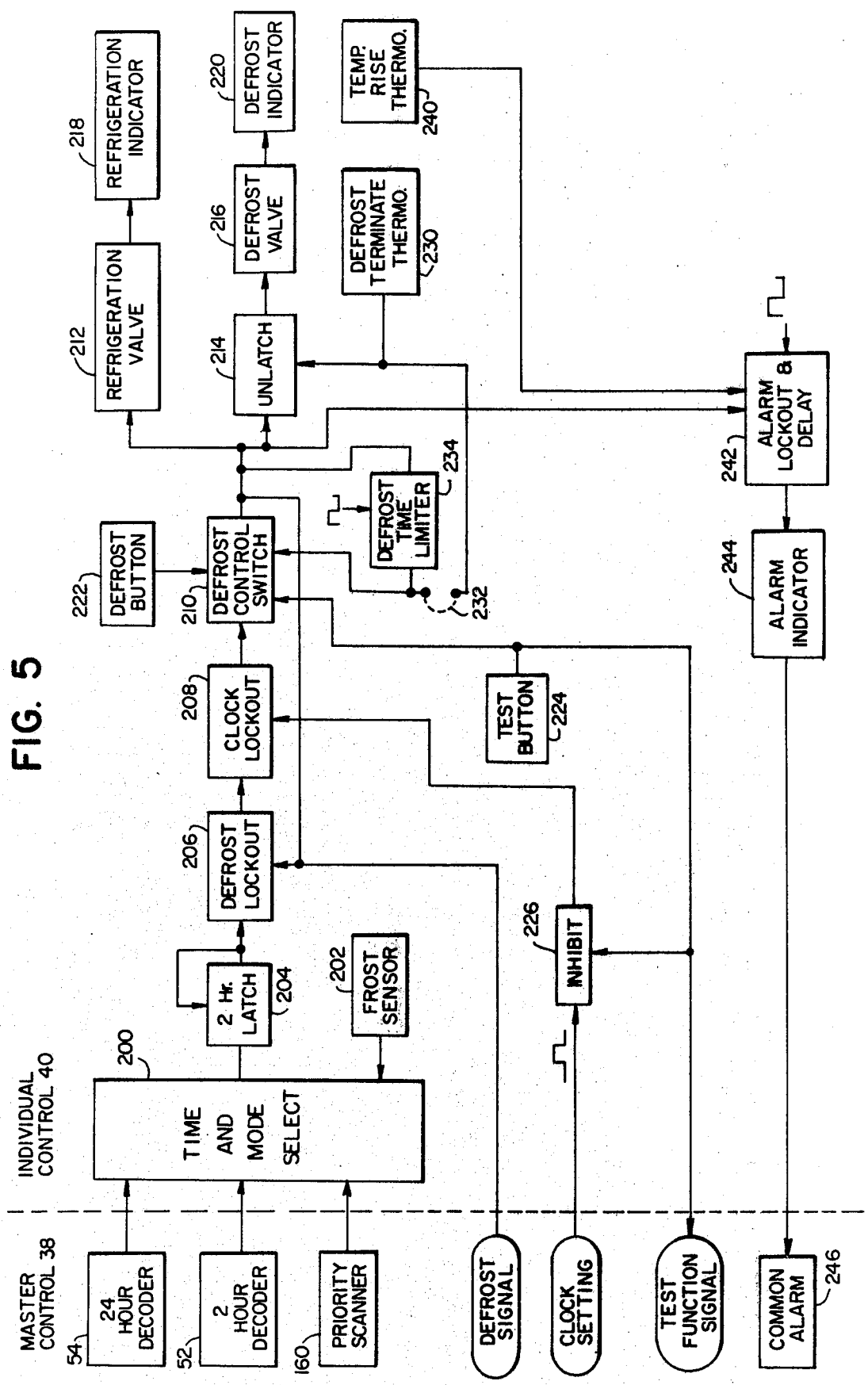
FIG. 5 is a block diagram illustrating the functional elements of an individual refrigeration/defrost control and connections with the master control of FIG. 2.
Figure 6A:
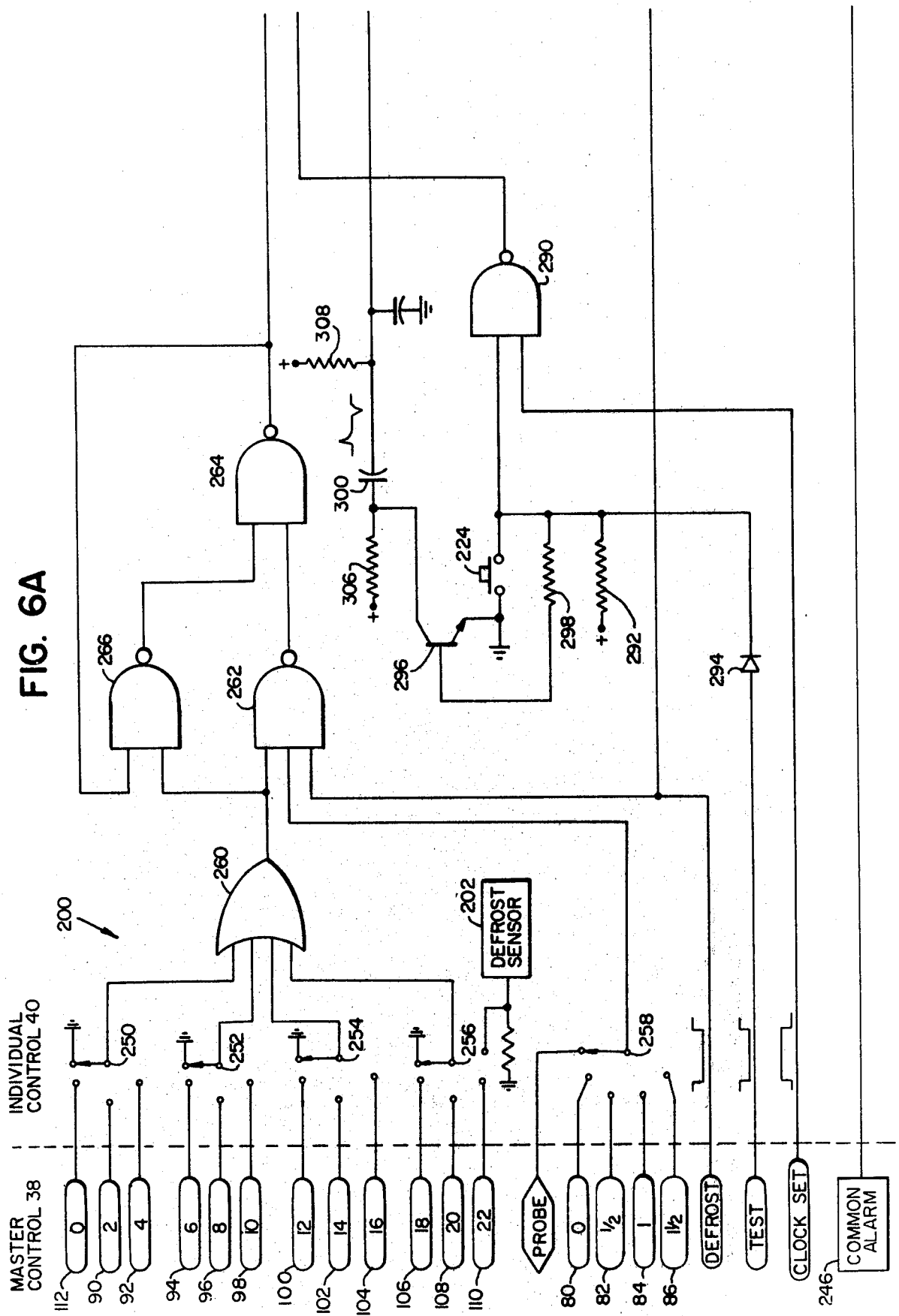
Figure 6B:
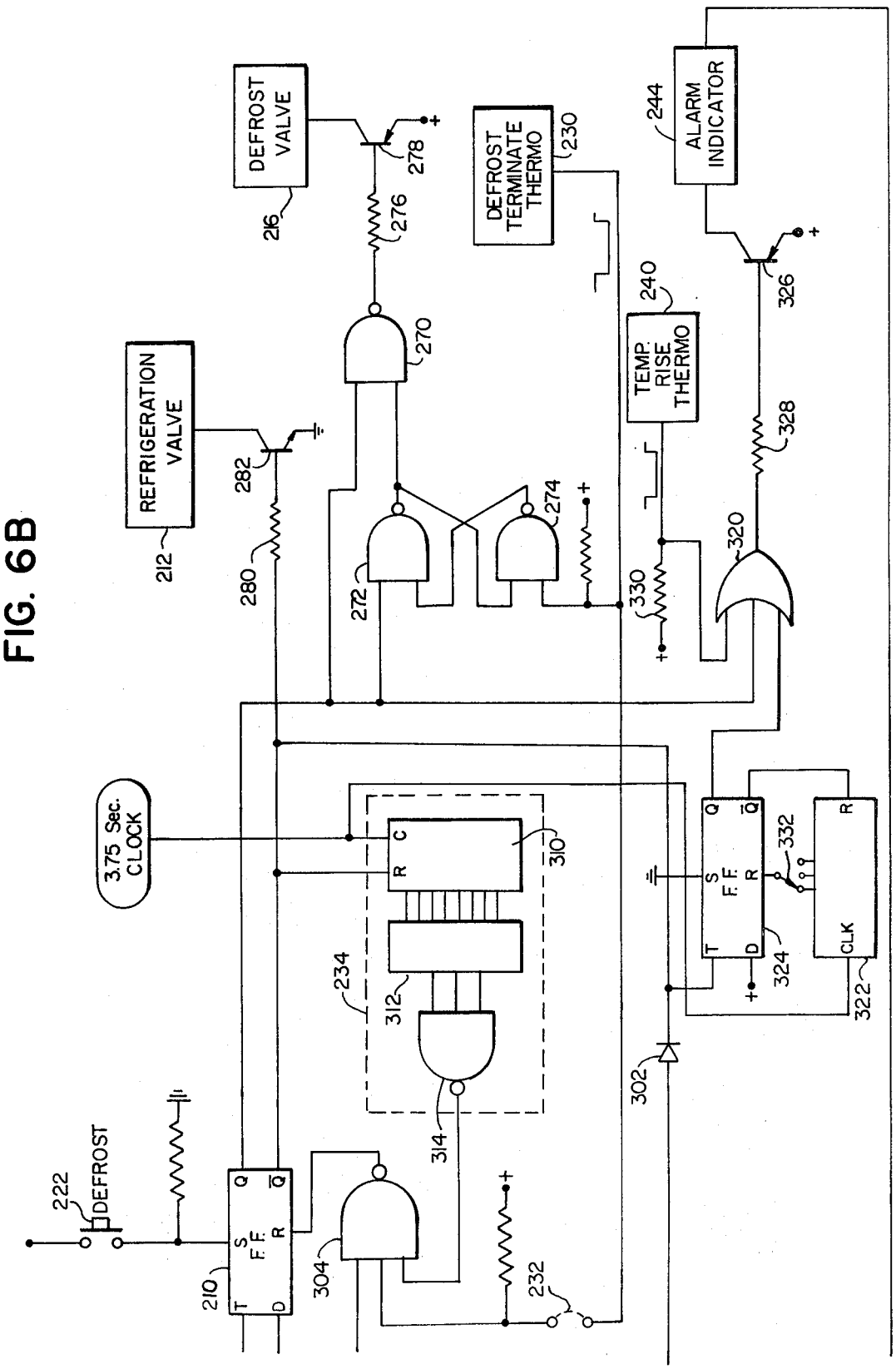

FIG. 5 is a functional diagram of the individual defrost control 40 for the evaporator 30 and illustrates the connections with the master control 38 and other individual controls.

The basic inputs to the individual control 40 are received by a time and mode selection circuit 200. Time signals are received by the circuit from the two-hour decoder 52 and the 24-hour decoder 54. Scanning signals when desired are also applied to the circuitry 200 from the priority scanner 160 and a frost signal may be provided from a frost sensor 202 connected with the evaporator 30 associated with the individual control. The frost sensor may be of the type described in U.S. Pat. No. 3,453,837 which provides a signal indicating a need for defrost when the temperature differential of air blown through the evaporator indicates that defrost is needed. Of course, other types of frost sensors providing a frost signal can be utilized in the present invention with equal facility.

The time and mode selection circuit 200 is designed to allow defrosting to occur either on a timed basis with signals received from the decoders 52 and 54 or a demand basis with a signal received from the sensor 202. The programming of the circuit determines precisely which mode of operation is employed and in a preferred embodiment the mode can be selected at will. When the priority scanner 160 is utilized to establish priority of defrosting among several different evaporators, a defrost actuating signal ordered on either a timed or demand basis is not transmitted by the circuit 200 until a discrete probing signal from the scanner is received. When the defrost actuating signal is ordered by any means, the selection circuit 200 transmits the signal through a two hour latch circuit 204, a defrost lockout circuit 206 and a clock lockout circuit 208 to a defrost control switch 210. The control switch 210 is preferably a solid state switch which can be set and reset by different signals. When the signal from the selection circuitry is received, the control switch 210 actuates a refrigeration valve or valves 212 and a defrost valve or switch 216 through an unlatching circuitry 214. The valve 212 closes and stops the flow of liquid refrigerant from the condenser into the evaporator and thusly terminates cooling of the evaporator. The refrigeration valve is also connected with a refrigeration indicator 218 such as a light that is turned off when the refrigeration valve is closed.

In a hot gas defrost system, the defrost valve 216 opens at substantially the same time that the refrigeration valve closes, and admits hot gases into the evaporator in order to melt ice and frost accumulated on the evaporator coils. When the valve 216 opens, a defrost indicator associated with the valve is turned on. Since the indicators 218 and 220 are associated only with the evaporator 30 in the group of evaporators defrosted and refrigerated by the compressor 12, reference to a dislay panel or circuit containing the indicators will immediately show what cycle the evaporator is in.

It should be understood that the defrost valve 216 in another embodiment of the refrigeration system may be a switching device which controls the flow of current in the electrical defrost heater connected with the evaporator 30. Thus, the invention is not limited to the hot gas defrost system but has general applicability to refrigeration systems having a variety of defrosting means.

If the timed defrost mode has been selected for the evaporator, the two-hour latch circuitry 204 effectively prevents the associated evaporator from being defrosted again within the two-hour period in which defrosting was originally ordered. Since the time for defrosting an evaporator is usually less than two hours, it is probable that a programmed time signal for the evaporator will still be present at the input of the selection circuit 200 when the defrosting cycle ends. Therefore, upon resumption of scanning the higher priority evaporators, defrosting of the same evaporator would be repeated without reaching the lower priority evaporators if the two-hour latch circuit were not employed.

The defrost lockout circuit 206 receives a defrost signal from any of the other evaporators which is in a defrosting cycle and prevents the evaporator 30 associated with the lockout circuit 206 from also being placed in the defrost mode even if a time or frost signal indicates a need for defrost. Accordingly, only one evaporator in the refrigeration system can be defrosted at a time in response to a defrost signal.

The clock lockout circuitry 208 prevents a defrost operation from being initiated by a defrost signal whenever a clock setting signal from the master control is received. Thus, during testing of other evaporators in the refrigeration system, the time clock is driven at an accelerated rate and may reach the programmed time for defrost of the evaporator 30 connected with the lockout circuit 208 before the programmed time for defrosting the evaporator under test. The lockout circuit disables the defrost signal from circuit 200 and ensures that only the tested evaporator goes into the defrost mode. The lockout circuit 208 also prevents the individual control 40 from responding to the time signals whenever the time clock is being manually set.

A manual defrost button 222 is connected with the defrost control switch 210 to initiate a defrosting operation independently of the decoders and sensors connected with the selection circuit 200. Since the button has a direct input to the control switch 210, a normal defrosting operation is carried out when the button is pressed regardless of the condition of the latching and lockout circuits 204, 206, and 208; therefore, the circuits can be overridden by the manual defrost button and more than one evaporator may be placed in defrost if necessary.

The individual control 40 is provided with a test button 224 to test the operation of the control and the associated portion of the master control 38. To perform the test function, it is necessary that the time and mode selection circuit 200 be programmed in the time mode with the evaporator scheduled to begin a defrost operation at a particular time. When the test button 224 is then pressed, a test function signal is transmitted from the individual control 40 to the master control where, as described above in the absence of a defrost signal from any of the other evaporators, a fast clocking signal is generated, and the digital time clock is driven at an accelerated rate. When the scheduled time of defrost for the individual control 40 is reached, a defrost actuating signal emanates from the circuit 200 and defrosting starts in conventional fashion.

It will be observed in FIG. 5 that the test function signal within the individual control 40 is applied to an inhibit circuit 226 interposed between the master control 38 and the clock lockout circuitry 208. The inhibit circuit prevents the clock setting signal generated in the master control 38 from enabling the clock lockout circuit 208, and thus as the time clock is driven at an accelerated speed, a defrost actuating signal derived from the decoders 52 and 54 is transmitted from the selection circuit 200 to the defrost control switch 210 to initiate the defrost operation.

In summary, when the test button 224 is pressed, the time clock 50 is driven at an accelerated rate until the scheduled time for defrost of the individual control 40 is reached, and the defrost operation is initiated. Even if the scheduled times of the other evaporators 34 and 44 are traversed, the other individual controls 42 and 44 associated with other evaporators will not initiate defrost operations due to the clock lockout circuitry in the other individual controls.

When defrost control switch 210 is actuated by the defrost actuating signal, the refrigeration valve 212 is closed and the refrigeration indicator 218 is turned off. At the same time, the defrost valve 216 or valves are actuated to admit hot gas to the evaporator or otherwise apply heat to the evaporator, and the defrost indicator 220 is turned on. It will be understood that the indicators 218 and 220 within the individual control 40 only reflect the mode of operation of the evaporator 30 associated with the control. Thus, the person running the test can visually determine from the indicators whether the master control 38 and the individual control 40 are operating properly.

As long as the test button 224 is pressed, the defrost operation will continue in its normal fashion. A defrost signal from the control switch 210 is transmitted to the defrost lockout circuitry 206 as well as the master control 38 and the other individual controls 42, 44, etc. By holding the test button 224, a full defrost operation can be carried out and then terminated in normal fashion as described in greater detail below; however, in most instances, the test button 224 is only held for a brief period of time until the refrigeration indicator 218 and defrost indicator 220 have turned off and on respectively. The operator has then received all information necessary to establish that the controls are properly operating and at that point he would release the test button 224. Upon release, the test function signal terminates in the inhibit circuitry 226, the master control 38 and other individual controls 40, 42. At the same time, a reset signal is transmitted from the button to the defrost control switch 210 which resets the refrigeration valve in the open position and closes the defrost valve 216 by way of the unlatch circuitry 214. The operator observes that the refrigeration indicator is turned on, and the defrost indicator is turned off and thereby verifies that the evaporator has returned to a refrigeration cycle following the test. The time clock 50 must then be reset to the correct time by means of the setting buttons 152, 154 in the master control of FIG. 2.

DEFROST TERMINATION

A time or demand defrost cycle, or a test cycle if the test button is held for the full duration of a defrost cycle, is terminated in one of three methods. In the first method a thermostat 230 or other sensor on the evaporator 30 associated with the individual control 40 sends a defrost terminate signal to the unlatching circuit 214 to cut off the actuating signal for the defrost valve 216 and allow the valve to close or shut off other heating devices. The thermostat 230 may be attached directly to the evaporator in order to determine when the evaporator has reached a temperature which will melt accumulated ice and frost or other types of sensors which measure the amount of frost or ice including the frost sensor itself may be utilized to produce the termination signal. If a run off jumper 232 is not connected as shown, the defrost control switch 210 holds the refrigeration valve 212 in the closed position to prevent immediate circulation of refrigerant through the evaporator. At this time, therefore, the evaporator is receiving neither heat through the defrost valve 216 nor refrigerant through the valve 212, and melted frost and ice is given the opportunity to run off of the evaporator coils.

At the end of a run-off period, the defrost control switch receives a defrost terminate signal from a defrost time limiter 234. The time limiter in a preferred embodiment is a settable solid state timer which is preset for a specific period equivalent to the maximum period for a defrost cycle. The limiter is driven by the same pulsed clocking signal which drives the priority scanner 160 in the master control; however, it should be understood that other types of timers and different clocking signals could be used.

The limiter starts its timing operation with the same signal that actuates the refrigeration and defrost valves 212 and 216, and when the preset time period expires a reset signal is transmitted to the control switch 210 to re-open the refrigeration valve 212. Thus, when the run off-jumper 232 is not in place, the defrost valve is closed by the thermostat 230 on the evaporator and the defrost control switch 210 holds the refrigeration valve closed until after the time limiter 234 has run out. The interval between closing of the defrost valve and re-opening of the refrigeration valve allows melted frost to run off the evaporator coils before refrigeration is resumed.

A second method of terminating the defrost operation occurs when the run-off jumper 232 is installed. When the defrost terminate signal from the thermostat 230 unlatches the circuitry 214 and closes the defrost valve 216, the defrost terminate signal is also transmitted directly to the control switch 210 and the refrigeration valve 212 is opened at the same time. Thus, there is no run-off period with the jumper 232 installed, and refrigeration of the evaporator begins immediately upon closing of the defrost valve.

A third method of terminating defrost occurs when the defrost thermostat 230 is disconnected, or not provided in the system, or the time limiter runs out before the thermostat sends a terminate signal. Under such circumstances, the defrost time limiter 234 runs its full preset time and thereafter resets the control switch 210. Thus, at the end of the timed period, the defost valve 216 is closed and the refrigeration valve 212 opens to begin a refrigeration cycle.

ALARM SYSTEM

A temperature rise thermostat 240 connected with the evaporator 30 and the individual control 40 is provided to detect abnormal increases in the evaporator temperature that arise from a failure of the refrigeration system. The thermostat is connected through an alarm lockout delay circuit 242 to an alarm indicator 244 within the individual control 40. The alarm indicator is also connected with a common alarm annunciator 246 in the master control 38. If an abnormal and unanticipated rise in temperature occurs in the evaporator 30, the thermostat 40 triggers the alarm indicator 244 to identify the evaporator as not properly functioning. The alarm annunciator 246 which is common to all of the evaporators in the refrigeration system is also sounded.

Since the defrosting operation raises the temperature of the evaporator 30 well above the temperature that triggers the alarm signal, it is necessary to lock out the alarm system during a defrost cycle and for a limited period thereafter while the temperature of the evaporator is lowered to its normal refrigeration level. The alarm lockout delay circuit 242 thus receives an actuating signal from the defrost control switch 210 as soon as the defrost cycle is initiated. In one form, the delay circuit is a solid state timer driven by the common clocking pulses applied to the time limiter 234 and the priority scanner 160. The delay circuit may be an adjustable solid state counter which allows the lockout period following defrost to be selected.

SOLID STATE EMBODIMENT

Figure 6:
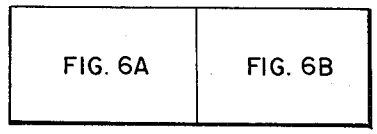
FIG. 6 is divided into FIGS. 6A and 6B as shown, and constitutes an electrical diagram illustrating a solid state embodiment of the individual refrigeration/defrost control in FIG. 5.

FIG. 6 illustrates a solid state embodiment of the individual control 40 described in FIG. 5 and the interconnections with the master control 38.

The time and mode selection circuitry 200 in FIG. 6 is comprised of a plurality of patch circuits or selector switches 250, 252, 254, 256, 258, and OR gate 260 and a control gate 262. The switches receive time signals from the decoders 52 and 54, frost signals from the sensor 202 and discrete probing signals from the scanner 160 in the master control. The switches 250, 252, 254, and 256 have input contacts which are connected with the twelve output terminals 90-112 of the 24-hour decoder 54 as shown and can be set to select one or more time signals for programming defrosting of the evaporator 30 when a timed defrost mode is desired. Thus, the evaporator can be set to defrost at more than one time per day. If a demand mode is desired rather than a timed mode, each of the switches 250, 252 and 254 is connected to ground and the switch 256 is set on the contact connected with the frost sensor 202 to receive frost signals.

The switch 258 has contacts connected respectively with the outputs 80-86 of the two-hour decoder 52 as well as one of the outputs of the priority scanner 160 in FIG. 2. It should be understood that the priority of the evaporator 30 is established by the output of the scanner connected with the input terminal of switch 258. If it is not desired to scan the evaporator 30 and control 40 at all, then greater resolution of the programmed defrost time may be had by connecting the switch 258 with one of the output terminals for the two-hour decoder 52.

The control gate 262 is illustrated as a three-input NAND gate which provides a coincidence function. One of the inputs is connected with the OR gate 260, and receives time signals or frost signals from the selector switches 250-256. A second of the inputs is connected with the selector switch 258 and receives other time signals or probing signals. The third input is normally held in the binary 1-state or enabling condition by the power supply and resistor 136 (FIG. 2) in the master control, but is placed in the disabling condition or binary 0-state by a defrost signal from any one of the other evaporators 32, 34 in a defrost cycle. Coincidence of the time, frost or probing signals on the first and second inputs of control gate 262 when the enabling signal is present on the third input causes a defrost actuating signal to be transmitted by the gate through a NAND gate 264 to the defrost control switch 210. A disabling defrost signal on the third input locks out operation of the control gate so that any of the timing, probing or frost sensor signals received while another evaporator is in a defrost cycle has no effect upon the control 40. Thus, the control gate performs the function of the defrost lockout circuit 206.

The defrost actuating signal is transmitted through a 2-hour latch circuit comprised of the NAND gates 264 and 266. In a time mode, the actuating signal when received by the gate 264 changes the output of that gate to 1-state and latches the output in that state through the NAND gate 266 until the time signal from the OR gate 260 disappears at the end of a two-hour period. Since a hot gas defrost operation can usuallly be completed substantially before a two-hour time signal would disappear from the output of OR gate 260, it would be possible, in the absence of the two-hour latch circuit, that a repeat defrosting operation would occur immediately upon the termination of a first defrosting operation. The latch circuitry ensures that a defrost operation will not occur because the output of NAND 264 is held in the 1-state by the latch circuitry, and the defrost control switch 210 is a solid state switch, such as a "D" type flip-flop actuated only by the positive going transition of an actuating signal received from the gate 264. Thus, by latching the gate 264 the control switch 210 is effectively disabled insofar as further time signals are concerned.

The manual defrost button 222 is connected directly to the set terminal of the defrost switch 210 and sets the switch independently of clock signals or other lockout circuitry. When set, a defrost cycle is carried out in a normal manner.

Whenever the defrost control switch 210 is actuated by either the defrost button or a clock signal from the control gate 262, the oppositely phased output terminals Q, Q change their respective binary states. The Q-terminal is connected to the defrost valve 216 by way of unlatching circuitry comprised of NAND gates 270, 272, 274. The output of the NAND gate 270 controls actuation of the valve through a resistor 276 connected to the base of a PNP power transistor 278. The NAND gates 272 and 274 have interconnected feedback and the output of the gate 272 is normally in the 1-state enabling the gate 270. Thus, when the Q-terminal of the control switch 210 assumes the 1-state, the gate 270 places rhe transistor 278 in the conductive state, and actuates the defrost valve 216 to apply heat to the evaporator 30.

At the same time the Q terminal of the switch 210 assumes the 0-state and deactuates or closes the refrigeration valve 212 through a resistor 280 and NPN transistor 282. Thus, a defrosting cycle is initiated by the control switch 210 by opening the defrost valve and simultaneously closing the refrigeration valve. At the same time a defrost lockout signal is produced by the Q terminal of the switch 210 and the signal is transmitted to the master control and other individual controls through the isolation diode 302.

If the mode switches 250–258 are in the timed mode, that is, each of the switches is in a position responding to a time signal, the control switch 210, refrigeration valve 212 and defrost valve 216 are actuated in the same manner as described above when the test button 224 is pressed and held in a test operation. Pressing the test button 224 grounds the associated input of a NAND gate 290 normally in the 1-state due to the power supply and resistor 292 and transmit a test signal such as shown through a diode 294 to the master control 38 and the other individual controls 42, 44 in the refrigeration system. At the same time, forward bias on the NPN transistor 296 through the base resistor 298 is removed which causes the capacitor 300 to discharge through resistors 306 and 308.

The test signal causes the time clock 50 in the master control to be driven at an accelerated rate until the programmed time of defrost for the control unit 40 is reached. At this point, the control switch 210 is actuated to initiate a defrost cycle and produces a defrost lockout signal from the Q output which signal is transmitted to the master control and other individual controls 42, 44 through the isolation diode 302. Driving the time clock at the accelerated rate then ceases but the defrost cycle initiated by the clock continues until the test button 224 is released.

When the test button 224 is released, ground is restored to the capacitor 300 through the transistor 296 which also lowers the input terminal of NAND gate 304 momentarily to the 0-state while the capacitor 300 recharges. The NAND gate 304 is momentarily actuated which pulses the reset terminal of the control switch 210 to reset the switch and the valve 212 and 216 for a refrigeration cycle. Thus, the test function terminates as soon as the test button 224 is released.

The NAND gate 290 serves the function of the clock lockout circuit 208 in FIG. 5 when the other individual evaporator controls 42, 44 are tested and inhibits actuation of the control switch 210 in the event that programmed time signals are received. For example, when a test button in the individual control 42 is actuated and the digital time clock begins running at an accelerated rate, the programmed time for individual control 40 could be reached before the programmed time for individual control 42. In this case, when the programmed time signal in control 40 is transmitted through the control gate 262 to the clocking terminal T of the control switch 210, the D or date terminal of the switch is at the 0-state due to the clock setting signal applied to the NAND gate 290. The binary state of the data terminal is transferred to the Q terminal when the clocking signal is received by the T input. Thus, no change in the state of the Q and Q outputs occurs even though a clocking signal is received by the switch, when some other evaporator is tested.

The NAND gate 290 also performs the same lockout function whenever the digital time clock 50 is manually set. However, the NAND gate 290 does not disable the control switch 210 when the test button 224 is actuated because the test signal is applied to the one terminal of the NAND gate 290 normally in the 1-state. Therefore, the gate 290 performs the operation of the inhibit circuitry 226 in FIG. 5.

To terminate the defrost operation with the aid of the defrost terminate thermostat 230, a 0-state signal is transmitted from the thermostat to the NAND gate 274 which in conjunction with the NAND gate 272 functions as a bi-stable flip-flop. The 0-state signal causes the outputs of gates 272 and 274 and NAND gate 270 to change and render transistor 278 nonconductive. The defrost valve 216 consequently closes. Since the flip-flop formed by gates 272 and 274 has no control over the refrigeration valve 212, the valve remains closed assuming that the run off jumper 232 is not installed. During the period in which both valves 212 and 216 are closed, melted ice and frost is allowed to drip off the evaporator coils.

It will be observed that the $\overline{Q}$ output of control switch 210 is connected to the reset terminal of time limiter 234. The limiter includes a resettable binary counter 310 driven by the clocking signals from the generator 180 in FIG. 2. The $\overline{Q}$ output of the control switch 210 holds the counter at its zero count until the defrost valve 216 is opened, and the refrigeration valve is closed. Clocking pulses drive the binary counter throughout the defrosting operation to a predetermined count or time which is adjusted or preset by a patch circuit 312 between the counter 310 and a three-input coincidence gate 314 in the limiter. The patch circuit and coincidence gate effectively form a time decoder which produces a termination signal at the end of a predetermined maximum defrost period. The coincidence signal activates the NAND gate 304 and causes the control switch 210 to be reset to initial conditions which renders transistor 282 conductive and opens the refrigeration valve 212. Thus, between the time that the defrost terminate signal closes the defrost valve 216 and the time that the counter 234 runs out, melted ice and frost from the evaporator coils is permitted to run off. Once the refrigeration valve is opened, condensed refrigerant is delivered to the evaporator 30 to resume the refrigeration process.

The second method of terminating the defrost operation is carried out when the run off jumper 232 is installed as shown in phantom. With the jumper installed, the defrost terminate signal actuates not only the unlatching circuit and defrost valve 216 but also the reset gate 304. The control switch 210 is then reset and the defrost valve 216 is closed through NAND gate 270 simultaneously with the opening of the refrigeration valve 212. No run off period is permitted.

The third method of terminating the defrost operation is carried out without the aid of the thermostat 230 either because the thermostat is not included in the system or because the time limiter 234 is selected to actuate the gate 304 and reset the control switch 210 before the defrost terminate signal from the thermostat is produced. As soon as the switch 210 is reset, the refrigeration valve and defrost valve are opened and closed respectively. Thus, again, there is no run off.

The alarm lockout and delay circuitry 242 in FIG. 5 is comprised of an OR gate 320 connected with the control switch 210 and the temperature-rise thermostat 240, a binary counter 322 and another "D" type flip-flop switch 324. During a refrigeration cycle, the temperature rise thermostat 240 normally permits a binary 1-state signal from the power supply and resistor 330 to exist at one input of the OR gate 320 which through resistor 328 blocks conduction of the PNP transistor 326 and prevents activation of the alarm indicator 244 and common alarm 246. When the evaporator 30 associated with the control 40 is defrosting, a temperature rise would remove the blocking signal and cause an alarm but the alarm indicator is effectively disabled by the delay circuitry during defrost and a brief period thereafter.

One input of the OR gate 320 is connected to the Q-terminal of the control switch 210. When the Q-terminal assumes the 1-state as a defrost operation is started, conduction of transistor 324 is blocked and thus the alarm indicator 244 will not produce a temperature rise alarm signal nor actuate the common alarm 246.

At the end of a defrost cycle when the refrigeration valve is again opened, the evaporator 30 will still be at an excessively high temperature which could generate the alarm signal. To continue blocking of the alarm signal, the flip-flop 324 is clocked by the positive-going transition of the Q output of switch 210 when the refrigeration valve 212 is opened. The flip-flop 324 then transmits a binary 1-state signal to OR gate 320 which signal replaces the blocking signal previously received from the control switch 210. At the same time, the Q output of the flip-flop resets the binary timer or counter 322, and the standard clocking pulses count out a predetermined time interval within which the evaporator should have been lowered to its normal refrigeration temperature. As illustrated, the counter has several outputs permitting adjustment or selection of the time interval for reaching the refrigeration temperature by means of a switch 332. One of the outputs is manually selected or connected to the reset terminal of the flip-flop 324 so that at the expiration of the selected time interval, the flip-flop 324 is reset, and the blocking signal is removed from the input of OR gate 320. By the end of the timed interval the evaporator should have been lowered to the normal refrigeration temperature, and the temperature signal from the thermostat 240 should have returned to its 1-state to continue to hold the transistor 326 in its nonconductive state and block the alarm. At any subsequent time when the temperature of the evaporator rises, the blocking signal is removed and the transistor 326 conducts and actuates the alarm indicator 234 and common alarm 246.

FIG. 7 illustrates a d.c. power supply means that is preferably utilized for energizing the master control 38, the individual controls 40, 42, 44 and the digital time clock 50 from 60 cycle utility power. It will be understood that in the event of a power failure and re-establishment of power, the digital clock without an internal memory resumes its counting or timing function at an unpredictable time. Also many of the solid state components such as the decoders 52, 54 lose track of their sequencing. When certain or all of the evaporators are scheduled for timed defrosting, it is conceivable that upon restoration of power the evaporators in need of defrost prior to the failure would not be reached for an inordinately long time because the solid state components cannot perform a memory function.

For this reason, a d.c. power supply 340 for the electrical system is augmented by an auxiliary battery 350. Since only the counting circuits in the time clock and other selected digital components in the master control 38 and individual controls 40, 42, 44 are critical to the memory function, and because all of the components could readily drain the battery, more than two voltage terminals are provided. There is at least one terminal 342 of one polarity and two terminals 344 and 346 of the opposite polarity energized by the power supply when utility power is on. The auxiliary battery 350 or other emergency power source is connected between the terminals 342 and 344 and the clock 50 and other critical components are connected with these terminals as indicated by the reference numerals in box 348. The remaining components possibly including the time display of the clock connect with terminals 342 and 346. The blocking diode 354 isolates the battery from such remaining components so they are not energized during a power outage. The diode 352 protects the battery from being overcharged by the power supply and protects the system components against inadvertent polarity reversal when the battery is installed. The diode 356 serves a resistive function and matches the diode 354 so that the power supply voltage applied to the components connected with terminal 346 is the same as the voltage applied to components connected with terminal 344. Thus the battery 350 and the connected components provide a memory for the various timing functions and ensure that upon the restoration of utility power, the defrosting sequence will resume from the point at which power was lost.

In summary, the refrigeration system illustrated in FIG. 1 has independently defrosted evaporators whose operation is regulated by a master control 38 and a plurality of individual controls 40, 42, 44 respectively. In a timed mode of operation, time signals are derived from a digital time clock and in a demand mode the individual controls respond to command signals from frost sensors. Testing of the individual controls is performed by driving the time clock at an accelerated rate to the programmed defrosting time. After every testing, time-setting and defrosting operation, the individual controls and their associated evaporators may be scanned in order of priority to detect which evaporator is the next unit in need of defrost. The entire control system can be embodied in solid state form for high reliability and compact installation.

While the present invention has been described in a preferred embodiment, it will be understood that numerous modifications and substitutions can be made without departing from the spirit of the invention. Most clearly, although the digital clock decoding technique provides a convenient device for obtaining widely spaced time signals for various defrosting operations, the timing signals can also be obtained from digital or analog timing devices in other ways. The priority scanning technique enables a clear system of priorities to be established for the evaporators in various refrigeration cabinets, but no scanning is necessary and other scanning devices such as shown and described in the copending U.S. application Ser. No. 812,198 referenced above can be used instead. The fast clocking feature for testing is integrated in the control system in a convenient manner when the testing device is a digital clock but it can also be utilized with other timing devices. Naturally, the scanning and testing functions may exist together or separately in a refrigeration system. While the individual defrost control and the master control have been illustrated in a solid state form, it should be understood that the general functions of the controls can be accomplished with other digital or analog equipment. Accordingly, the present invention has been described in several forms by way of illustration rather than limitation.

I claim:

1. A defrost control apparatus for a plurality of refrigeration evaporators having associated defrosting equipment for removing accumulated ice or frost comprising:
    signalling means having outputs associated with each of the evaporators for indicating that the respective eavporators individually are due to be defrosted;
    scanning means associated with the outputs for each of the evaporators for interrogating the outputs individually and sequentially in a predetermined order of priority concerning the need for defrost;
    actuating means responsive to the scanning means and the signalling means outputs for initiating operation of the defrost equipment associated with an evaporator when an output is scanned and indicates that the corresponding evaporator is due to be defrosted; and
    resetting means connected with the scanning means for resetting the scanning means to the beginning of the scanning order without completing scanning of the outputs, the resetting means being responsive to the actuating means for resetting the scanning means each time the actuating means initiates operation of the defrost equipment.

2. A defrost control apparatus as defined in claim 1 wherein the signalling means comprises timing means producing timing signals from the outputs indicating that defrosting of a selected evaporator is due.

3. A defrost control apparatus as defined in claim 1 wherein the signalling means comprises sensing means associated with the respective evaporators for providing signals from the outputs indicating excessive accumulation of frost or ice.

4. A defrost control apparatus as defined in claim 1 further including means for halting the scanning means while the defrosting equipment is operating.

5. A defrost control apparatus as defined in claim 1 wherein:
    the signalling means comprises a time clock providing time signals at spaced intervals on the outputs; and
    the resetting means includes further means for resetting the scanning means on the occurrence of at least some of the time signals.

6. A defrost control apparatus as defined in claim 1 further including means associated respectively with each of the evaporators for preventing a repeated defrosting of a scanned evaporator immediately after said evaporator has been defrosted.

7. A defrost control apparatus as defined in claim 1 wherein the signalling means comprises settable timing means producing timing signals at different times for initiating defrost of at least some of the evaporators; and the resetting means includes means for resetting the scanning means whenever the timing means is set.

8. A method of defrosting a refrigeration system having a plurality of evaporators with individual defrost controls comprising:
    repeatedly scanning the evaporators sequentially in a predetermined order of priority to detect evaporators which should be defrosted;
    terminating the step of scanning when an evaporator needing defrosting is detected;
    initiating defrosting of the detected evaporator by means of the individual defrost controls of the detected evaporator; and then
    resuming the step of scanning with the evaporator having the highest priority.

9. A method of defrosting a refrigeration system as defined in claim 8 wherein the defrosting of a detected evaporator is terminated before the scanning of the evaporators is resumed.

10. A method of defrosting as defined in claim 8 further including the step of preventing repeated defrosting of a detected evaporator as soon as the step of scanning is resumed.

11. A method of defrosting as defined in claim 10 wherein the step of preventing comprises preventing a repeated defrosting of a detected evaporator for a period after defrosting of the detected unit is terminated.

12. A method of defrosting as defined in claim 8 further including the step of selecting one time of day for defrosting a plurality of the evaporators and wherein the step of scanning comprises initiating scanning of the evaporators with the evaporator having the highest priority when the selected time of day arrives to cause said plurality of evaporators to be defrosted in order of priority.

13. A method of defrosting a refrigeration system as defined in claim 8 wherein the step of terminating comprises terminating scanning of the evaporators when a time signal indicates a particular evaporator is due to be defrosted.

14. A method of defrosting a refrigeration system as defined in claim 8 wherein the step of scanning the evaporators comprises scanning a plurality of defrost indicators associated respectively with each of the evaporators.

15. A method of defrosting a refrigeration system as defined in claim 14 wherein the step of scanning comprises scanning time controlled indicators to determine if the corresponding evaporators are due for defrost.

16. A method of defrosting a refrigeration system as defined in claim 14 wherein the step of scanning comprises scanning frost sensing means connected with the evaporators to determine if the corresponding evaporators are due for defrost.

17. In a refrigeration system having a plurality of individually defrostable evaporators, the improvement comprising:
    master control means for controlling the defrosting cycles of the evaporators and including means for generating a plurality of discrete probing signals on a corresponding plurality of outputs for the respective evaporators, the outputs being excited with probing signals sequentially in fixed order and in cyclic succession beginning with a predetermined one of the outputs every time the generating means is started, and means for starting and stopping the operation of the generating means; and a plurality of individual defrost control means connected respectively with the plurality of evaporators and respectively with the plurality of outputs of the generating means whereby an individual defrost control means periodically receives a probing signal from a selected output of the generating means and the individual control means as a group receive probing signals sequentially in fixed order starting with the same individual control means each time the generating means is started.

18. In a refrigeration system, the improvement of claim 17 wherein each of the individual control means has a control gate with an enabling condition and a disabling condition which correspondingly enables the individual control means and disables the individual control means; and the outputs of the generating means are connected respectively in operative relationship with the control gates of the individual control means whereby the probing signals enable and disable the individual control means in fixed order always starting with the same individual control means.

19. In a refrigeration system, the improvement of claim 18 further including signalling means associated with each of the evaporators and providing signals indicating that the evaporators respectively are due to be defrosted; and wherein the control gates of the individual control means for the evaporators are connected to receive the respective signals from the signalling means and to gate the signals into the individual control means in the enabling condition.

20. In a refrigeration system, the improvement of claim 19 wherein the signalling means comprise frost sensing means providing individual signals for each of the plurality of evaporators respectively and indicating a predetermined accumulation of ice or frost.

21. In a refrigeration system, the improvement of claim 19 wherein the signalling means comprises timing means providing timing signals for defrost of the respective evaporators.

22. In a refrigeration system, the improvement of claim 19 wherein the individual control means produce a defrost signal whenever the corresponding evaporator is being defrosted, and the control gates of the individual control means are connected to receive the defrost signals from each of the other individual control means and to respond by assuming the disabling condition.

23. In a refrigeration system, the improvement of claim 17 wherein the means for generating a plurality of discrete probing signals comprises a solid state integrated circuit.

24. In a refrigeration system, the improvement of claim 23 wherein the integrated circuit is a resettable digital counter driven by a series of clock pulses.

25. An electronic defrost control apparatus for a refrigeration system including an evaporator having individual defrosting equipment for removing frost from the evaporator coils, comprising:

timing signal generating means providing a plurality of timing signals for selectively initiating defrosting operations at given times;

a solid state switch operatively connected with the defrost equipment to initiate defrost of the evaporator and having an input connected with the timing signal generating means for receiving a timing signal to actuate the switch and initiate defrost of the evaporator, the switch also having a resetting terminal to reset the actuated switch independently of the timing signal received at the input; and means for terminating a defrosting operation connected to the reset terminal of the solid state switch.

26. An electronic defrost control for an evaporator as defined in claim 25 wherein the terminating means comprises a temperature sensor connected with the evaporator and providing a signal to the reset terminal of the solid state switch to indicate that defrosting is complete.

27. An electronic defrost control for an evaporator as defined in claim 25 wherein the terminating means comprises a digital timer having an input connected with the solid state switch and responsive to the switch to start timing of a defrost operation, and an output connected with the reset terminal of the switch and providing a defrost terminate signal a predetermined time after a defrost operation is started.

28. An electronic defrost control for a plurality of evaporators as defined in claim 25 wherein:

the solid state switch associated with the evaporator has two oppositely phased outputs for controlling both defrost and refrigeration operations;

refrigeration valve means for controlling the flow of a refrigerant through the evaporator is connected with one of the switch outputs;

defrost valve means for controlling the application of heat to the evaporator is connected to the other of the switch outputs;

unlatch circuit means is interposed between said other of the switch outputs and the defrost valve means for actuating said defrost valve means in accordance with the operation of said other of the outputs and for deactivating the defrost valve means independently of said other of the outputs; and the terminating means comprises a time limiter connected to the resetting terminal of the solid state control switch to reset said switch and open said refrigeration valve and also includes a sensor connected with the unlatch circuit means to terminate the application of heat to said evaporator, whereby the application of heat to the evaporator may be terminated independently of the solid state switch prior to the expiration of a preset time established by the time limiter.

29. An electronic defrost control apparatus for a refrigeration system as defined in claim 25 wherein the timing signal generating means comprises a digital clock having a digital time display and decoding means connected with the display for producing the timing signals.

30. An electronic defrost control apparatus for a refrigeration system as defined in claim 29 wherein the digital clock has counting circuits and a primary power supply is connected in energizing relationship with the timing signal generating means including counting circuits in the digital clock, and an auxiliary power supply is also connected to the counting circuits of the clock to maintain power on the counting circuits in the event of a power failure of the primary power supply.

31. An electronic defrost control as defined in claim 25 wherein the solid state switch is a "D" type flip-flop.

32. An electronic defrost control as defined in claim 25 further including:

a temperature rise sensor connected with the evaporator for detecting a predetermined increase in the temperature of the evaporator;

an alarm connected with and responsive to the temperature rise sensor for signalling a temperature rise;

alarm lockout means connected with and responsive to the solid state switch and interposed between the temperature rise sensor and the alarm, the lockout means including a digital timer responsive to operation of the solid state switch to prevent actuation of the alarm by the temperature rise sensor during defrost and for a predetermined period after the switch is reset.

* * * * *